United States Patent [19]

Thompson

[11] 3,949,634
[45] Apr. 13, 1976

[54] APPARATUS FOR CHARGING A SCRAP METAL SHEAR

[75] Inventor: Wallace M. Thompson, Cordele, Ga.

[73] Assignee: Harris Press & Shear Corporation, Cordele, Ga.

[22] Filed: Apr. 11, 1975

[21] Appl. No.: 567,075

Related U.S. Application Data

[62] Division of Ser. No. 426,186, Dec. 19, 1973, abandoned.

[52] U.S. Cl. ..................... 83/278; 83/280; 83/437; 83/923; 214/1.5
[51] Int. Cl.² ..................... B26D 5/20; B23Q 5/22
[58] Field of Search ............ 83/207, 238, 276, 278, 83/279, 280, 250, 268, 281, 923; 100/270, 271, 280; 144/245 E; 214/1.5; 198/221; 271/267, 269

[56] References Cited

UNITED STATES PATENTS

| | | | |
|---|---|---|---|
| 2,776,610 | 1/1957 | Roselius | 83/281 X |
| 3,116,658 | 1/1964 | Baker | 83/278 |
| 3,803,969 | 4/1974 | Jouhal | 83/923 X |

Primary Examiner—Willie G. Abercrombie
Assistant Examiner—Leon Gilden
Attorney, Agent, or Firm—Cushman, Darby & Cushman

[57] ABSTRACT

A charging box for a scrap metal shear is provided with a top opening where a compressed block of scrap metal may be loaded. A first ram is provided to the rear of the scrap metal block so that it may be pushed forward for a short distance in the charging box. A second ram is provided whose rear most position is behind the forward most position of the first ram means. After the first ram is retracted the second ram means is brought into position behind the block of scrap to continue movement of the scrap block into the shear. The two rams are so arranged that while the second ram is feeding a block of scrap metal into the shear a second block may be loaded into the charging box and moved forward by the first ram until the first ram has reached its forward most position where the block of scrap may then be engaged by the second ram when it is returned from feeding the first block of scrap into the shear. The means are provided for elevating the second ram above the block of scrap metal as the second ram is returned to its initial engaging position behind the block of scrap.

9 Claims, 12 Drawing Figures

APPARATUS FOR CHARGING A SCRAP METAL SHEAR

This is division of application Ser. No. 426,186 filed Dec. 19, 1973, now abandoned.

BACKGROUND OF THE INVENTION

1. Field of the Invention

This invention relates to an apparatus and method for feeding blocks of compressed scrap metal to a shear and more particularly, to a method and apparatus for substantially continuously feeding these blocks to the shear through a charging box.

2. Prior Art

Many devices and methods have been developed for feeding blocks of compressed scrap metal to a metal shear, all of which suffer from the same deficiency, i.e., the inability to continuously or substantially continuously process these scrap metal blocks. Most of these methods and apparatus previously devised utilize a single ram in a charging box which is loaded from the top, so that the block of scrap metal must be completely cut by the shear and the ram then retracted, prior to reloading the charging box. As a result of this method, and the apparatus utilized in conjunction therewith, a substantial amount of time is consumed between the time when one block has been completely run through a shear and the time when the next block may be started.

Other types of continuous feed mechanisms and processes to which one might look when attempting to design a method and apparatus for continuously feeding a scrap shear, such as a continuous conveyor belt, for example, would not be useful in providing a means for charging a large scrap metal shear since a substantial horizontal force must be applied to the block of scrap while it is being sheared in order to maintain it in proper relationship to the shearing mechanism, and to overcome friction force between scrap and shear throat sides. Thus, all of the devices which do not apply a substantial horizontal force to the block of scrap metal could not be effectively utilized for continuously processing blocks of compressed metal scrap through a shear.

SUMMARY OF THE INVENTION

The process and apparatus disclosed and claimed herein overcome the above described disadvantages by providing a method and apparatus for substantially continuously feeding blocks of compressed scrap material from a charging box into a shearing means.

The process generally comprises the steps of loading a block of compressed scrap metal into a first portion of the charging box remote from the shearing means and then moving the block forward in the charging box a short distance, by means of a first ram means. The first ram means is then retracted and a second ram means is placed in position behind the block of scrap and then feeds the block of scrap into the shear through the remainder of the charging box. The forward most position of the first ram means is forward, or closer to the shear, of the rearmost position of the second ram means, but is not capable of moving far enough forward to feed a block of scrap completely through the shear. In some instances, however, where the block of scrap is fairly long, it is initially fed by means of the first ram means until it reaches its forward most position, and then the remainder of the block of scrap is fed by the second ram means as described above.

While the second ram means is feeding the first block of scrap, a second block of scrap is loaded into the charging box. The loading can be accomplished once the second ram means is moved sufficiently forward to be clear of the portion of the charging box in which the next block of scrap is to be loaded.

Once the second ram means has completely fed a block of scrap through the shear the ramming portion is removed from the charging box so that it will not come into contact with the next block of scrap already positioned in the charging box. The second ram means is then retracted, either simultaneous with the retraction of the first ram means or subsequent thereto. The ramming portion is then repositioned in the charging box, behind the next block of scrap to be fed to the shear. In the preferred embodiment of the present invention, described below, the movement of the ramming portion out of and into the charging box is accomplished by elevating it above the next block of scrap positioned within the charging box and then lowering it back into the box behind the block of scrap.

DETAILED DESCRIPTION OF THE PREFERRED EMBODIMENT

Figures 1, 2:
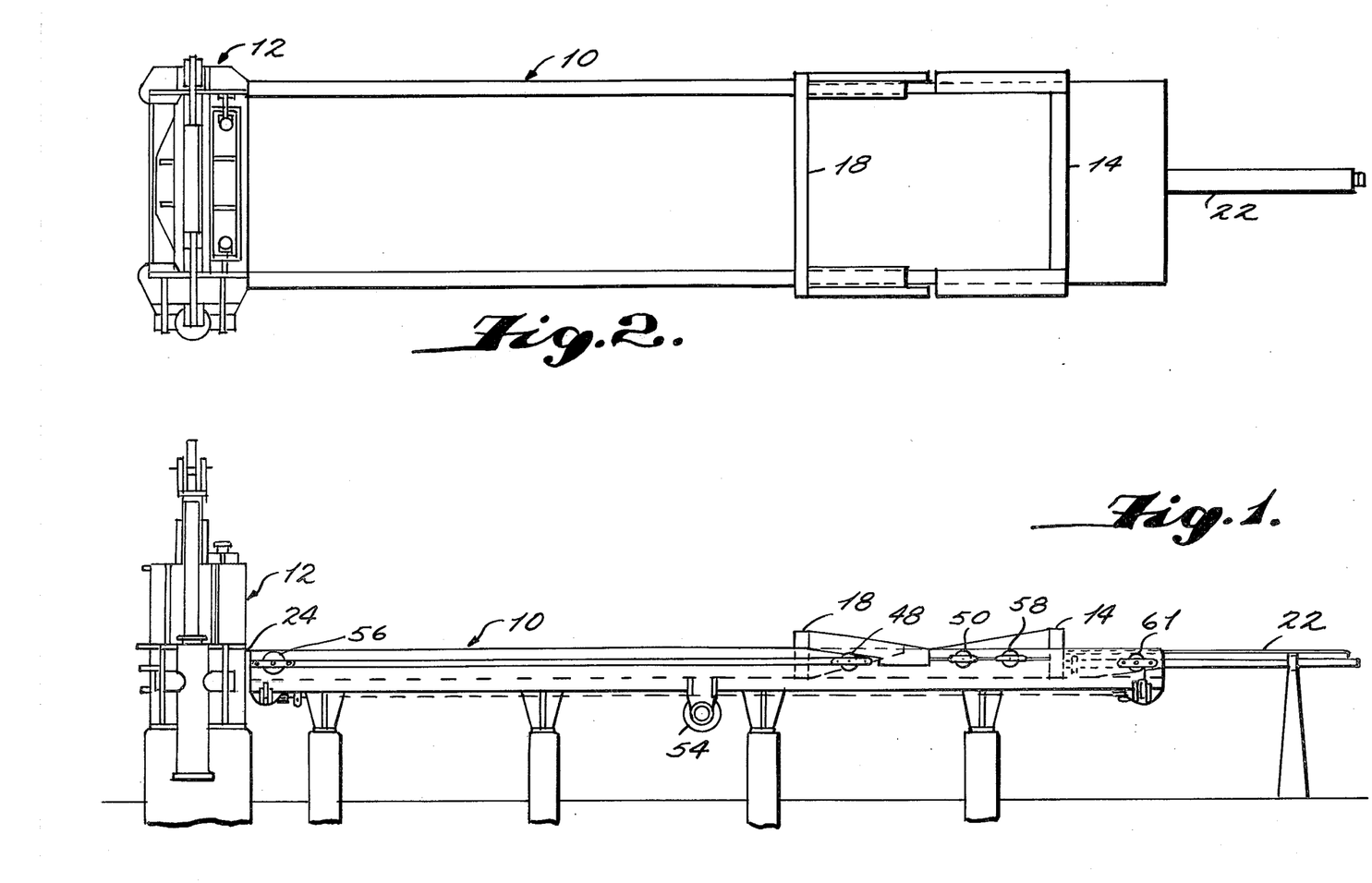
FIG. 1 is a side plan view of an embodiment of the present invention attached to a conventional shearing means.
FIG. 2 is a top plan view of the embodiment shown in FIG. 1.

In FIG. 1 is shown the charging box 10 disposed in appropriate relation to a conventional shearing means 12. The charging box 10 is aligned with the shearing means 12 so as to feed a block of compressed scrap metal into the shear where it is severed in appropriate lengths. Generally, the components of the present invention consist mainly of a first ram means 14 disposed in the rear portion of charging box 10 remote from shearing means 12 and a second ram means 18 disposed forward of first ram means 14 in charging box 10. The first ram means 14 is moved horizontally in the charging box 10 by means of a hydraulic ram assembly 22 disposed rearwardly of the charging box. The hydraulic ram assembly 22 is supplied with hydraulic fluid from the pumps (not shown) of the shear means 12 and controlled by appropriate valving systems so as to move first ram means 14 forward or rearward in the charging box 10.

The second ram means 18 is likewise moved forwardly and rearwardly in the charging box 10, but unlike the first ram means 14, the second ram means 18 is moved by use of a series of pulleys and a winch, designed to apply adequate force during both the forward and rearward movement of second ram means 18. The pulley and winch system will be described in greater detail below.

Figure 5:
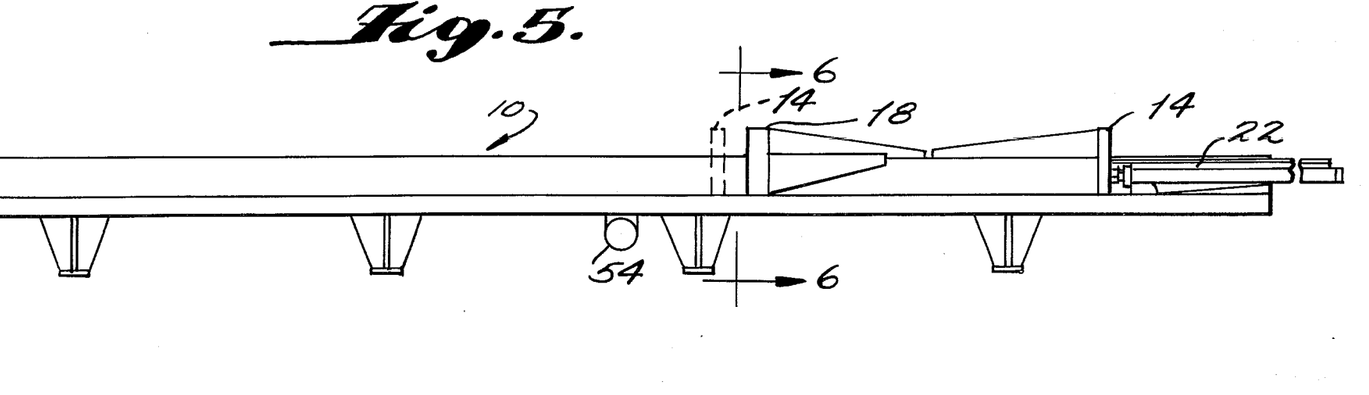
FIG. 5 is another side plan view of the embodiment shown in FIG. 1.
Figure 6:
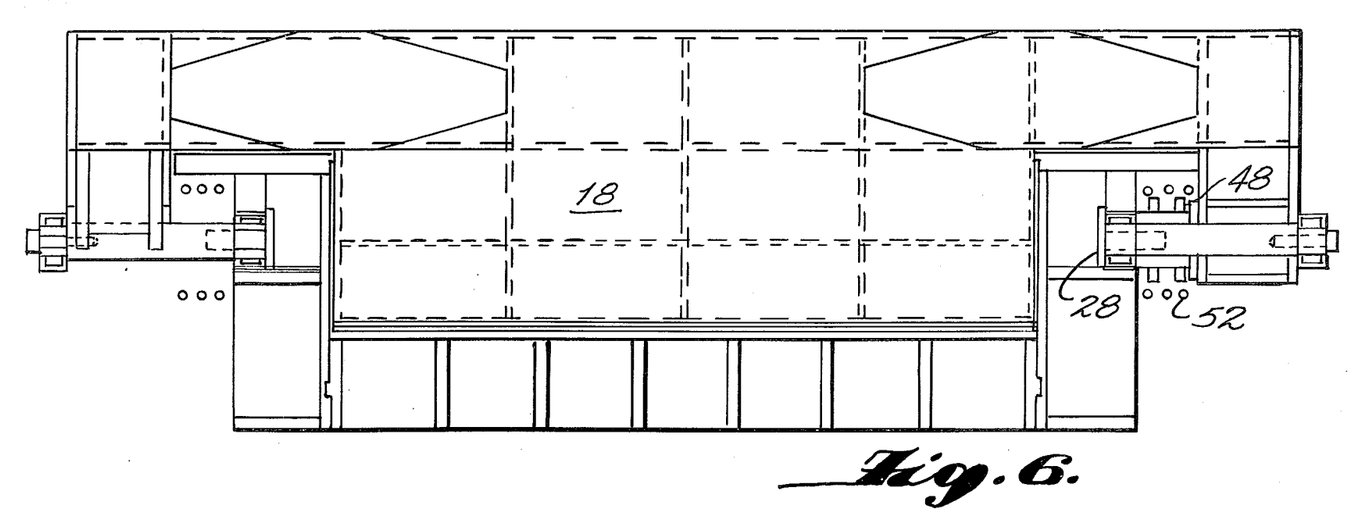
FIG. 6 is a detailed front plan view of a portion of the ram means along with a cross section of the charging box taken through line 6-6.
Figure 7:
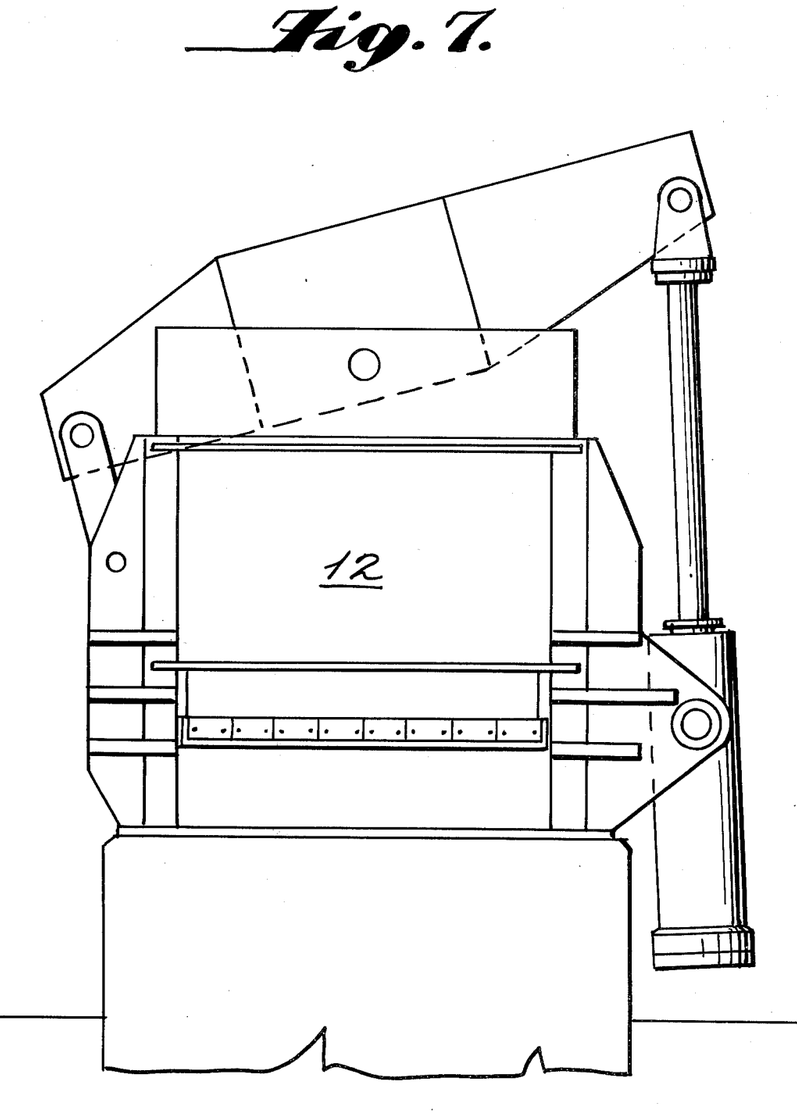
FIG. 7 is a front plan view of a conventional shearing means utilized in conjunction with the present invention.
Figure 8:
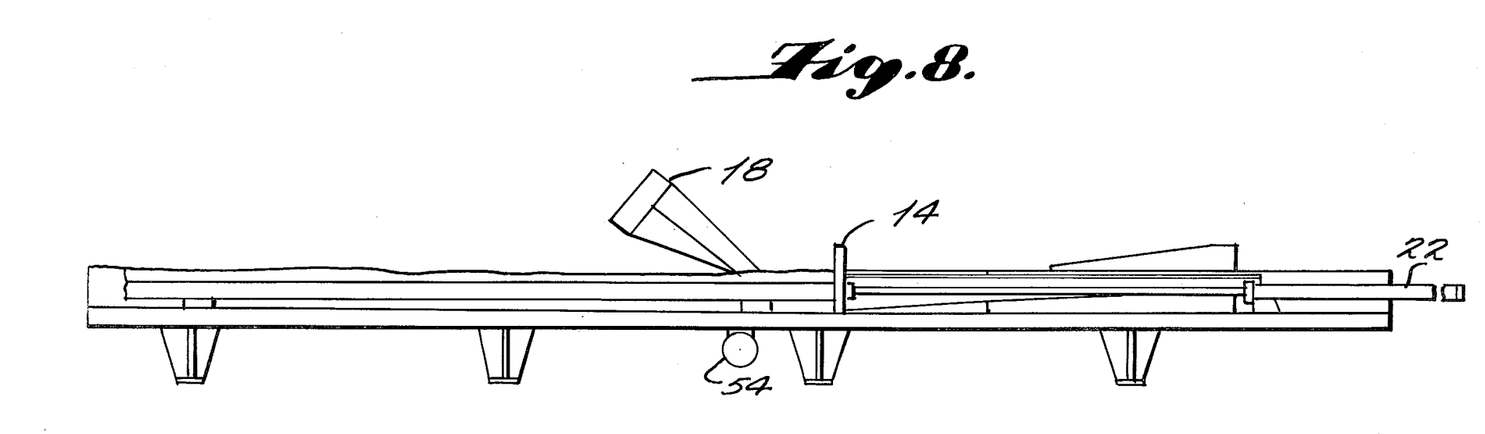
FIG. 8 is a cross-sectional view of the embodiment of the present invention with a block of compressed scrap metal contained therein.
Figure 9:
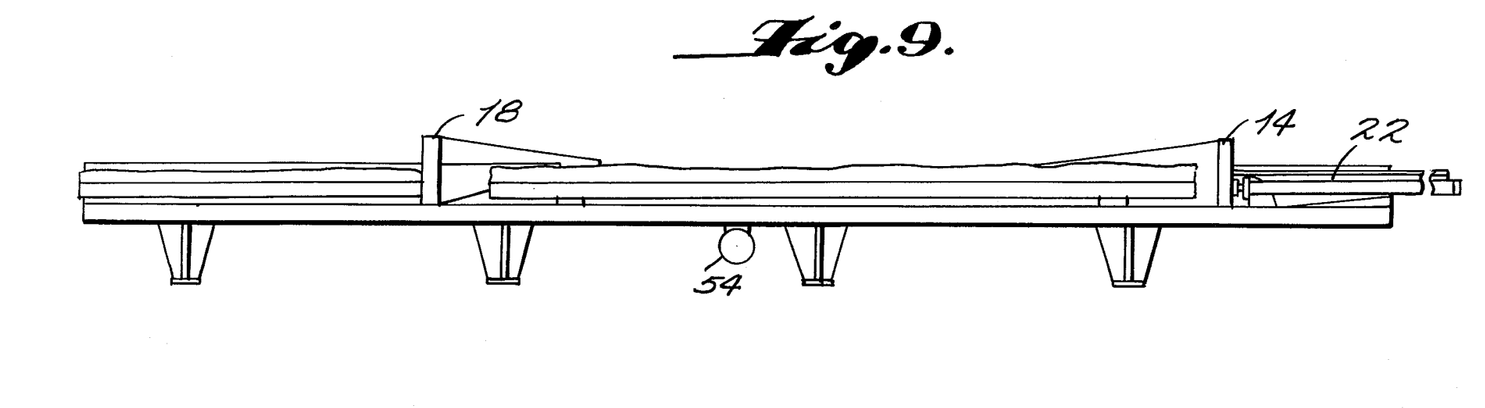
FIG. 9 is a cross-sectional view of a portion of the embodiment of the present invention showing two blocks of scrap metal, one positioned ahead of a first ram means and one positioned ahead of a second ram means.

The first ram means 14 moves from a rearmost position, as shown in FIG. 1, to a foremost position, as shown in phantom in FIG. 5, ahead of the rearmost position of second ram means 18, shown in that position in both FIGS. 1 and 5, so that the block of scrap may be pushed forward far enough to allow the rearwardly moving second ram means 18 to engage the back edge of the scrap metal block.

In a typical preferred cycle of operation beginning with first ram means 14 retracted and second ram means 18 positioned behind a block of scrap, the block is moved forward in charging box 10 and fed into shearing means 12 to be cut into appropriate lengths. When second ram means 18 has fed enough of a block of scrap through shearing means 12 to be positioned far enough forward of first ram means 14, a second block of scrap is loaded into the charging box. The first block of scrap continues to feed into shearing means 12 until it has been completely sheared. The ramming portion of the second ram means is then elevated out of the charging box and the path of the next block of scrap to be fed to the shearing means 12. The first ram means 14 then feeds the next block of scrap forward to its forward most position and second ram means 18 is retracted to its rearmost position both ram means moving, at least through a portion of their movement, simultaneously. The first ram means 14 is then retracted and the ramming portion of second ram means 18 is lowered into position behind the next block of scrap to complete the cycle.

Although it is contemplated to be within the scope of the invention that it may be utilized for the processing of any compressed scrap material, especially large bulky scrap, the preferred embodiment is shown processing precompressed freight cars which are usually 40 to 74 feet in length.

Figure 4:
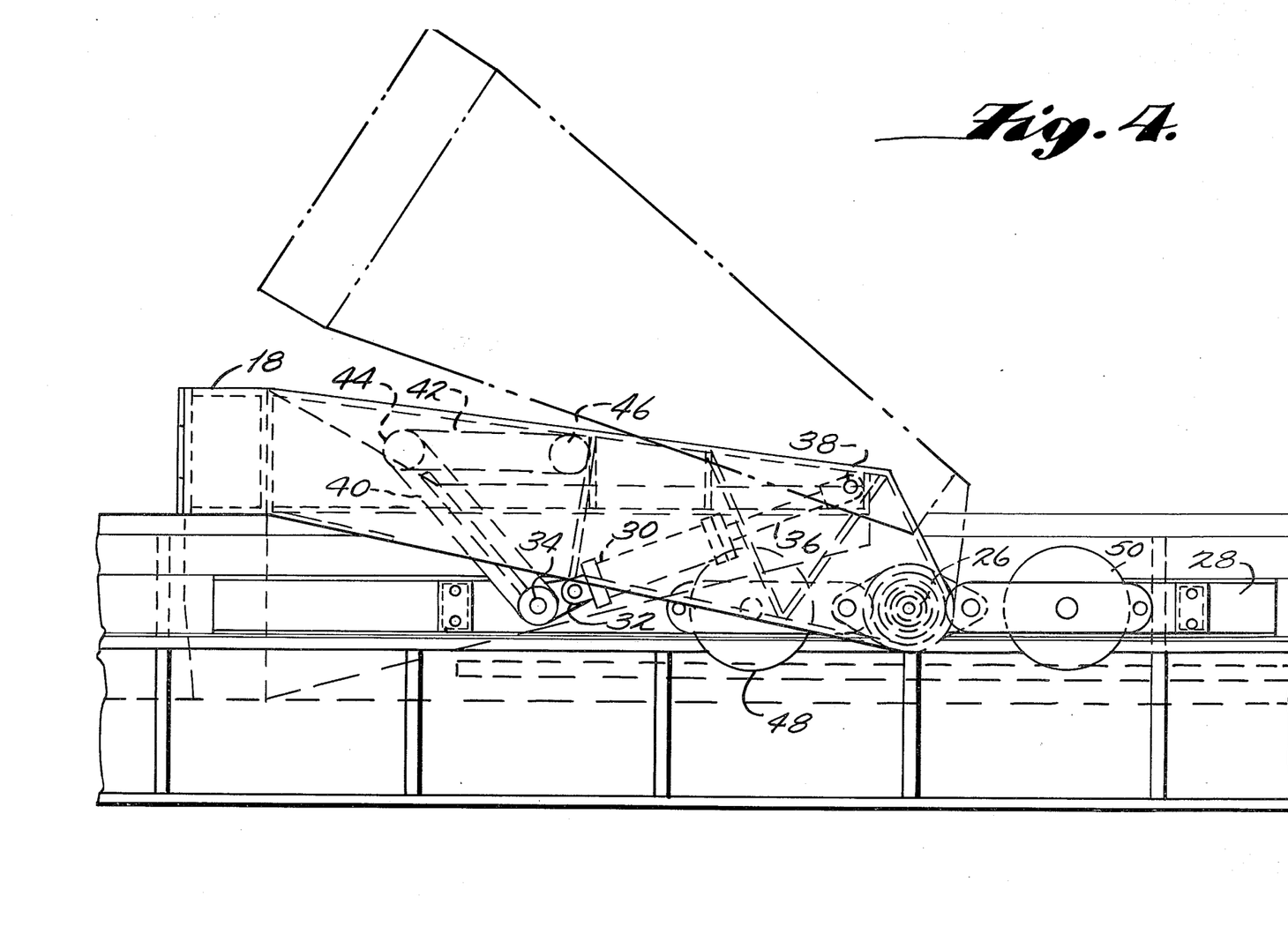
FIG. 4 is a detailed plan view of the second ram means of the embodiment of the present invention shown in FIG. 1.

The ramming portion of second ram means 18 is capable of being tilted upwardly out of charging box 10 so that it may be returned to its rearmost position while a block of scrap is fed forward in charging box 10 by first ram means 14. Referring to only one side of the embodiment shown, with the understanding that the same parts are duplicated on the opposite side of the charging box 10, the ramming portion of second ram means 18 (best shown in FIG. 4) is pivotable upwardly about a shaft 26 disposed outboard of the charging box 10 and secured to a movable rail portion 28 secured in a channel for movement in the horizontal direction along the outside of charging box 10. A hydraulic lift arm 30 is utilized which is pivotally connected at end 32 to bar 28 by means of shaft 34. The piston rod 36 of hydraulic cylinder 30 is attached to the ramming portion of second ram means 18 by means of shaft 38 connected to the rear portion of the ramming portion of second ram means 18 so as to rotate the ram means about shaft 26. Stabilizing support members 40 and 42 are provided which extend upwardly as the hydraulic lift arm is activated so as to maintain the ramming portion of second ram means 18 in a stable position and give additional support to prevent sideways movement of the ramming portion of ram means 18. Support member 40 is pivotally mounted on shaft 34 and has its other end 44 pivotally mounted to member 42 which is in turn pivotally mounted, by shaft 46, to ramming portion of second ram means 18.

The movable rail portion 28 also carries pulleys 48 and 50 which are secured for rotation on rail 28 and move with it horizontally along the side of charging box 10. Pulley 48, in conjunction with the remainder of the winch-pulley system, moves the second ram means 18 in the forward direction as the cable 52 is wound about winch drum 54. Pulley 50 and cable 53 are utilized in conjunction with the remainder of the pulley-winch system to move second ram means 18 rearwardly, after a block of scrap has been fed through the shearing means 12. The direction of movement of second ram means 18 is dependent upon the direction of rotation of drum 54 since the cables associated with pulleys 48 and 50 are wound and unwound oppositely about drum 54.

The second ram means 18 is pulled forwardly and rearwardly by a dual system of pulleys on opposite sides of charging box 10 which, due to the manner in which the cables are wound about winch drum 54, wre not entirely symmetrical (see FIG. 11) but operate in substantially the same manner and, therefore, will be described with respect to only one side of the pulley system.

Figure 3:
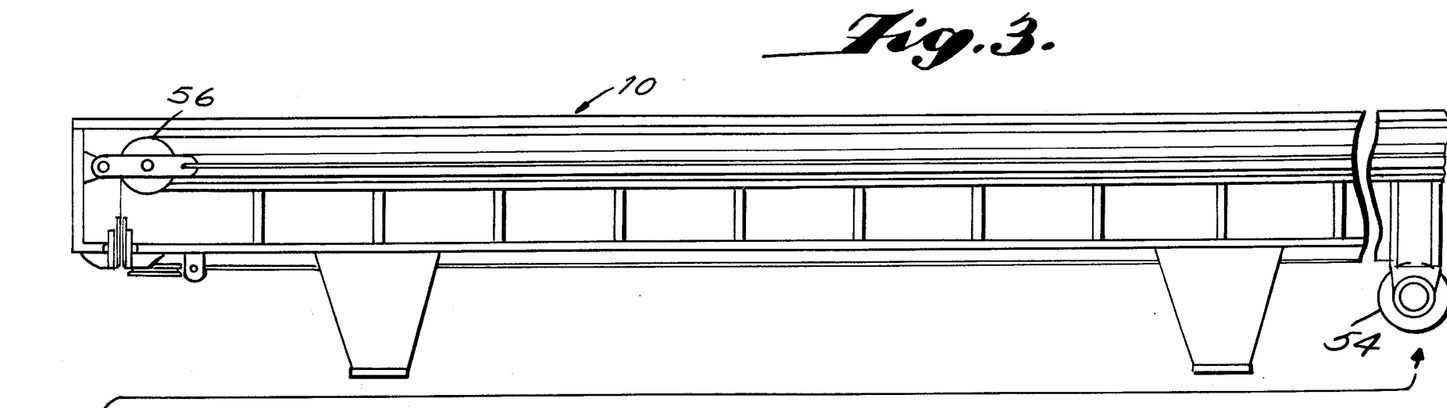
FIG. 3 is an expanded view of the embodiment of the present invention shown in FIG. 1.
Figure 10:
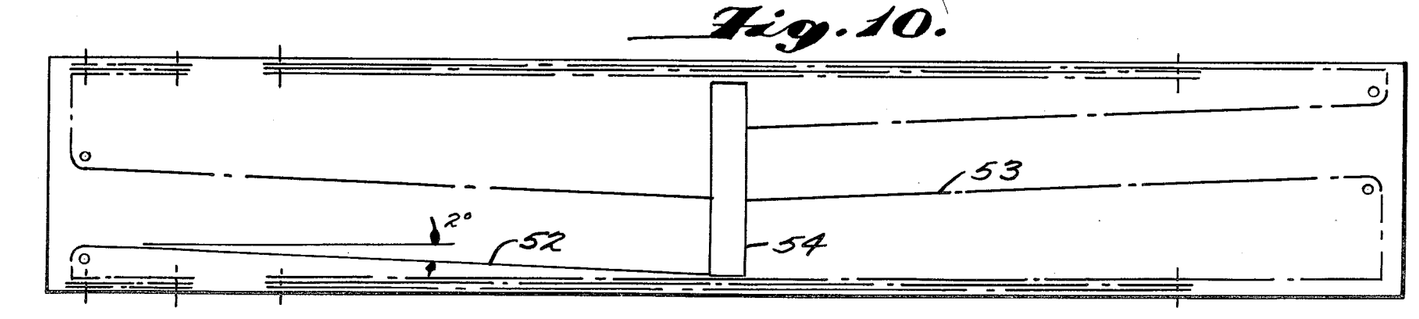
FIG. 10 is a bottom schematic view of the embodiment of the present invention showing the path of travel for the cable and winch utilized therein.
Figure 11:
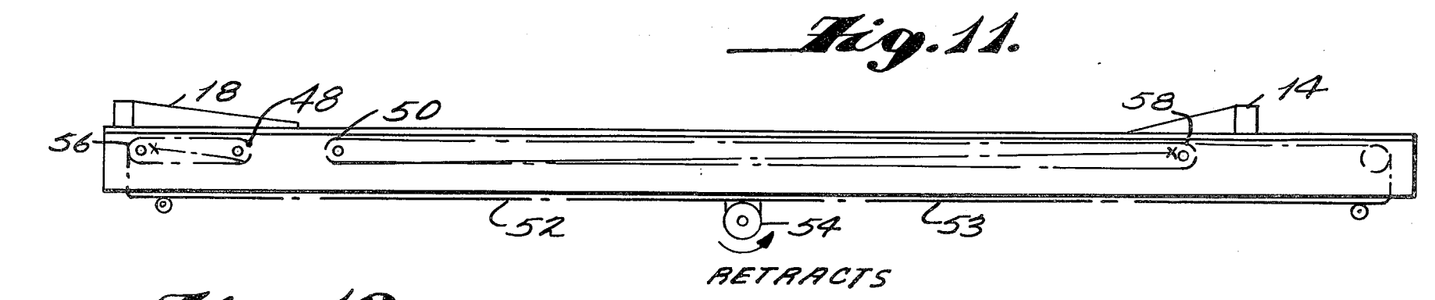
FIG. 11 is a side plan view of the embodiment shown in FIG. 10 showing the second ram means in full forward position.
Figure 12:
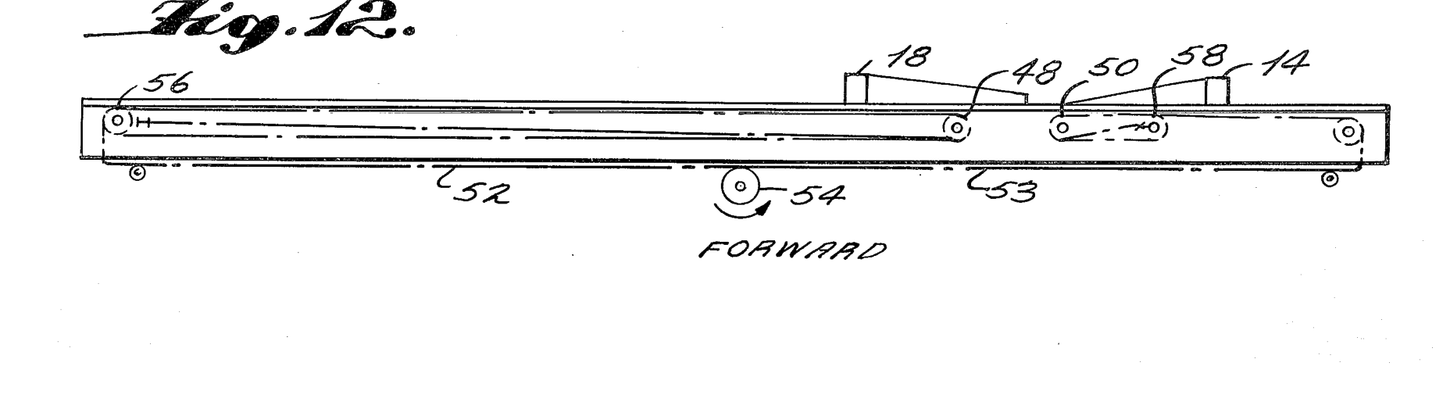
FIG. 12 is a side plan view of the embodiment shown in FIG. 10 with the second ram means in full retracted position.

The pulley-winch system can best be described in connection with FIG. 3 which illustrates a side view of charging box 10 showing physical position of the pulleys, winch, and cable, and FIGS. 10, 11 and 12 which illustrate schematically the path of the cables through the pulleys in their various locations on the charging box 10. The second ram means 18 is moved forwardly when cable 52 is wound, for the sake of example, on winch drum 54 in the counterclockwise direction, one end of the cable 52 being secured to winch drum 54 and the opposite end being secured to the clevis of pulley 56. FIG. 11 shows the second ram means 18 positioned fully forward.

Second ram means 18 is pulled rearwardly by means of cable 53 as winch drum 54 is rotated counterclockwise. One end of cable 53 is secured to winch drum 54 and an opposite end is secured to the clevis of pulley 58.

Since winch drum 54 is located beneath the charging box 10 it is necessary to route the cables along the bottom of the charging box and then to bring them out at each end of the charging box and up alongside adjacent the channel in which bar 28 moves. Therefore, for example, a series of three pulleys is utilized at the corner of the charging box 10 such as pulleys 60, 61 and 62 to allow cable 53 to properly engage both winch drum 54 and pulley 50 and thus, effect movement in the rearward direction of second ram means 18.

It is to be noted that pulleys 48, 50, 56 and 58 are all triple sheave pulleys with three wraps which allow the cable to be passed through them several times without overlapping, since the system operates on a block and tackle principle to effect movement of the second ram means 18 forwardly and rearwardly. Again, this is also true for the pulleys on the opposite side of the charging box 10 to effect movement of second ram means 18.

Winch drum 54 is secured for rotation to the central portion of the underside of charging box 10. It may be driven in any conventional manner, such as by an electric motor and gear reduction system, or by using a hydraulic motor on one or both ends of drum 54, supplied with fluid from the shear pump. Automatic control means is provided to coordinate the forward feed movement of first ram means 14 and second ram means 18 with shear 12. All other movements of both first and second ram means are controlled manually by an operator through the use of appropriate control apparatus (not shown) to effect the movements described herein. For example, if the block of scrap to be loaded into the charging box 10 is longer than the distance from the forward most position of first ram means 14 to the shearing means 12, the ramming portion of second ram means 18 can be elevated out of the charging box and the first ram means can be utilized to feed the block of scrap through the shearing means until it has reached its forward most position whereupon the second ram means takes over and completes the feeding operation. The movement of the first ram means, when utilized in this manner, is automatically coordinated with the cutting operation of the shearing means as is the case with the second ram means when it is feeding.

Although the foregoing description illustrates the preferred method and apparatus of the present invention, it will be apparent to those skilled in the art that variations are possible. All such variations as would be obvious to those skilled in this art are intended to be included within the scope of this invention.

What is claimed is;

1. Apparatus for substantially continuously feeding compressed blocks of scrap material into a shearing means, comprising:
    a charging box having a bottom wall and two side walls defining a generally U-shaped cross section and longitudinally alignable with said shearing means in operative relation thereto, said charging box having an opening therein for inserting a block of compressed scrap into said box from a position parallel thereto and remote from said shearing means;
    a first ramming means mounted within said charging box for moving said scrap forward through a portion of the distance to said shearing means;
    a second ramming means mounted on said charging box for (1) moving said scrap into said shearing means and (2) movement from a first position adjacent said shearing means to a second position rearward of the forward most position of said first ramming means with the path of movement out of the path of movement of another block of scrap as it is being moved forward in said charging box by said first ramming means; and
    power means for causing said movement of said first and second ramming means.

2. An apparatus as defined in claim 1 wherein said charging box has an open top of adequate dimensions to allow a block of scrap to be placed in said charging box.

3. An apparatus as defined in claim 1 wherein said power means for causing movement of said second ramming means is a winch and pulley system which moves said second ramming means between said first position and said second position.

4. An apparatus as defined in claim 1 wherein said second ramming means has a vertical face portion for engaging and moving said scrap, said ramming means having motor means for moving said face portion between a position in said charging box wherein said face portion will engage said scrap and a position wherein said face portion will be elevated so as to permit said scrap to pass thereunder.

5. An apparatus as defined in claim 1 wherein said power means for causing movement of said first ramming means is at least one hydraulic ram assembly which moves said first ramming means between a position in said charging box to the rear of said opening and a position in said charging box a short distance forward of the rearmost position of said second ramming means, where said second ramming means can engage said other scrap moved forward in said charging box by said first ramming means.

6. An apparatus as defined in claim 3 wherein said winch and pulley system includes:
    a winch drum disposed below said charging box and operated by fluid motors, one or more operably associated with ends of said drum, said motors being supplied with fluid from a shearing means pump unit; and
    a plurality of pulleys disposed on opposite side portions of said charging box in such a manner that a plurality of cables secured to said winch are operable to move said second ramming means between said first and second positions.

7. An apparatus as defined in claim 1 in combination with said shearing means.

8. An apparatus as defined in claim 1 and including means for coordinating the movement of said first and second ramming means and said shearing means in such a manner that said shearing means will be substantially continuously supplied with blocks of compressed scrap.

9. An apparatus as defined in claim 1 including means for coordinating the movement of said first ramming means with said shearing means so that long blocks of scrap may be partially fed to said shearing means by said first ramming means.

* * * * *